Nov. 13, 1962 C. D. WRIGHT, JR 3,063,757
ELECTRO-PNEUMATIC BRAKE APPARATUS
Filed Dec. 17, 1959
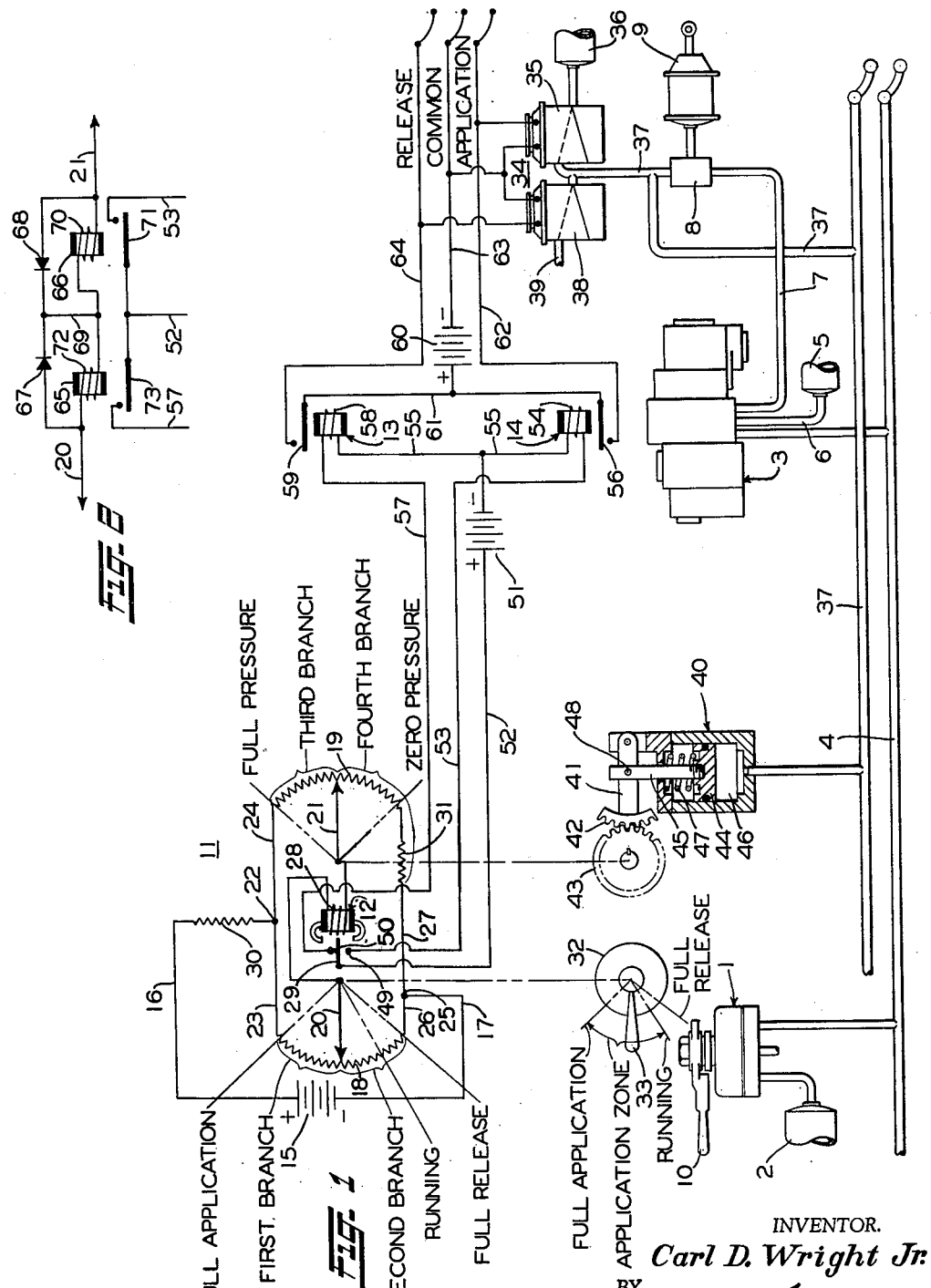
INVENTOR.
Carl D. Wright Jr.
BY
Adelbert A. Steinmiller
Attorney

3,063,757
ELECTRO-PNEUMATIC BRAKE APPARATUS
Carl D. Wright, Jr., Pittsburgh, Pa., assignor to Westinghouse Air Brake Company, Wilmerding, Pa., a corporation of Pennsylvania
Filed Dec. 17, 1959, Ser. No. 860,262
2 Claims. (Cl. 303—20)

This invention relates to brake systems for locomotives and more particularly to an electro-pneumatic brake system for addition to locomotives equipped with only pneumatic brake control to provide optional pneumatic or electro-pneumatic brake control on the locomotive and cars of a train.

Of the many types of brake systems utilized on locomotives, some are provided with a combined electro-pneumatic and pneumatic brake control, some are provided with only a pneumatic brake control but include facilities such as drum contactors on the brake valve with selector switches for adding an electro-pneumatic control, and some are provided with only a pneumatic brake control and have no facilities such as drum contactor means for adding an electro-pneumatic brake control. In recent years, electro-pneumatic brake control systems have come to be used more frequently because of their rapidity of operation, simplicity and reliability. Addition of electro-pneumatic brake systems on locomotives not designed to include an electro-pneumatic brake system has posed problems of application.

According to the present invention, there is provided a novel electro-pneumatic straight air brake control equipment which may be applied relatively inexpensively and with a minimum of effort to a locomotive equipped with only pneumatic brake control equipment to thereby provide optional pneumatic and electro-pneumatic control of the brakes of a train. The new electro-pneumatic locomotive equipment includes a Wheatstone bridge arrangement normally balanced and having a manually operated brake valve means connected to said bridge arrangement and separate from the pneumatic brake valve on the locomotive. Operation of the separate brake valve means to effect a brake application or release, as desired, causes an unbalance of the bridge arrangement, which in turn effects selective operation of a three-position relay to, in turn, cause corresponding selective energization and deenergization of train wires that control operation of magnet valves controlling supply and release of fluid under pressure to and from the brake cylinders and a straight air pipe. The fluid pressure in the straight air pipe correspondingly operates a pneumatically operated actuator to cause rebalancing of the bridge arrangement resulting in lapping of the magnet valves of the brake apparatus until unbalance is again effected by movement of the separate brake valve handle either to increase the degree of brake application or to reduce the degree of brake application.

In the accompanying drawings, FIG. 1 is a diagrammatic view, showing one embodiment of a brake system in which a novel electro-pneumatic braking system is associated with a conventional pneumatic brake system in a manner to permit optional operation thereof. For convenience of description, the electro-pneumatic braking system is illustrated in a "brake application" position, while the pneumatic brake system is shown in a "running" position.

FIG. 2 is a partial schematic diagram, illustrating an alternate control arrangement wherein two separate relays are utilized with two directional diodes in lieu of the single three-position relay of the embodiment shown in FIG. 1.

Description

Referring to the drawing, a simplified form of the usual pneumatic braking equipment for a locomotive is shown including a pneumatic brake valve 1 connected to a main reservoir 2 and a control valve 3 via brake pipe 4, an auxiliary reservoir 5 connectable through the control valve 3 via pipes 6 and 7 to a double check valve 8 and to the brake cylinder 9. The pneumatic braking apparatus is controlled in the usual well-known manner by manually operating a handle 10 on the brake valve 1 as desired, as will be explained in more detail hereinafter. The novel electro-pneumatic brake control equipment provided in accordance with the present invention is shown on the locomotive in a "brake application" condition, and comprises circuitry including a Wheatstone bridge arrangement 11 for controlling operation of a directional relay 12 which in turn controls energization of local train wires (hereinafter described) to cause selective energization or de-energization of slave relays 13 and 14. The relays 13 and 14 correspondingly control energization of the train wires throughout the train to effect electro-pneumatic brake control as hereinafter described.

The Wheatstone bridge arrangement 11 is supplied with direct current voltage from a source of supply, such as a battery 15, by way of wires 16 and 17. The Wheatstone bridge arrangement consists of four resistance branches. A resistor 18 forms the first and second branches of the bridge arrangement, while a resistor 19 forms the third and fourth branches. A movable contactor arm 20 is variably positioned on the resistor 18 by means hereinafter described, the point of contact of the contactor arm 20 being the junction point dividing the resistor 18 into the first and second bridge branches. A movable contactor arm 21 is variably positioned on the resistor 19 by means hereinafter described, the point of contact of contactor arm 21 and resistor 19 being the junction point dividing the resistor 19 into the third and fourth bridge branches. The first and third bridge branches are connected at a junction point 22 by wires 23 and 24. The second and third bridge branches are connected at a junction point 25 by wires 26 and 27. Connected between the movable contact arms 20 and 21 is the directional relay 12 having a winding 28 and a front-and-back contactor 29. A current-limiting resistor 30 is inserted in the supply wire 16 to limit the current supplied to the bridge arrangement by way of the wires 16 and 17 at the junction points 22 and 25. A resistor 31 is inserted in the fourth branch of the bridge for use during complete release of the brakes as hereinafter explained.

Associated with the bridge arrangement is a manual control device 32, separate from the brake valve 1, having a handle 33 connected by any suitable mechanical linkage (shown herein as a broken line) to the pivot point of contactor arm 20 in the bridge circuit. Rotative movement of the handle 33 results in corresponding rotative movement of the contactor arm 20 on the resistor 18 in either a clockwise or counterclockwise direction as viewed in the drawing.

As labeled in FIG. 1, the handle 33 is movable clockwise from a "running" position through an application zone towards a "full application" position to apply the brakes to a degree according to the amount of movement into said application zone as will be understood hereinafter. Movement of the handle 33 in a counterclockwise position from any position in the application zone results in a brake reduction in accordance with the amount of movement. Movement of handle 33 counterclockwise beyond "running" position into a "release" position results in a full release of the brakes. When the handle 33 is moved out of a brake "release" position into its application zone, as appropriately labeled in FIG. 1, the contactor arm 20 moves clockwise on the resistor 18 from the counterclockwise extremity of the resistor through an angle corresponding to the degree of displacement of the handle out of its brake "release" position. In the full application position of the handle 33, the contactor arm 20 is moved to the clockwise extremity of resistor 18 as appropriately labeled on the drawing.

An application and release magnet valve device 34 is provided on the locomotive and comprises an application magnet valve 35 operable when energized to effect supply of fluid under pressure from a supply reservoir 36 to a straight air pipe 37, and a release magnet valve 38 operable when energized to effect venting of the straight air pipe 37 to atmosphere at a vent 39 and normally effective to prevent venting of the straight air pipe 37. The supply reservoir 36 is supplied with fluid under pressure from a supply pipe (not shown) extending throughout the train in a usual well-known manner. The internal paths of communication in the magnet valves are indicated on the drawing by a solid line and a broken line, the broken line representing the path of communication when the magnet valves are energized, and the solid line representing the path of communication when the magnet valves are deenergized. The straight air pipe 37 is connectable via the double check valve 8 to the brake cylinder 9, depending on whether the electro-pneumatic brake system is in operation as is explained in more detail hereinafter.

Also connected to the straight air pipe 37 and associated with the bridge arrangement is a pneumatic actuator 40 with a movable actuating arm 41 having at its outer end a suitable gear sector 42, which in turn is connected by any suitable mechanical linkage (shown herein as a gear wheel 43 and a shaft represented by a broken line) to the pivot point of contactor arm 21 in the bridge circuit. Movement of the actuating arm 41 results in a corresponding movement of the contactor arm 21 on the resistor 19. A piston 44, having a piston rod 45, is slidably positioned in a chamber 46 within the actuator 40, said chamber 46 being supplied with fluid under pressure from the straight air pipe 37 in a manner to cause the piston 44 and piston rod 45 to be moved upward against a spring 47 in correspondence with the pressure in chamber 46. The piston rod 45 is connected by a pin 48 to the pivotally mounted actuating arm 41 and thus variations of the pressure of fluid in the straight air pipe 37 causes similar variation of fluid under pressure in chamber 46 to effect variations of positioning of the actuating arm 41, which in turn via the gear arrangement 42, 43 and suitable linkage, correspondingly varies the position of contactor arm 21 on the resistor 19. When the fluid pressure in the straight air pipe 37 is at a maximum, the actuating arm 41 will be at its extreme raised position to cause the contactor arm 21 to be positioned at the counterclockwise extremity of the resistor 19, and when the straight air pipe pressure is zero, the actuator arm 41 will be positioned by the spring 47 in its lowermost position to cause the contactor arm 21 to be correspondingly positioned at the clockwise extremity of resistor 19.

The directional relay 12 is of well-known conventional type having the winding 28 constructed in a manner such that when the current flows therethrough from left to right, the relay will be energized to close the movable contactor 29 in its down or back closed position engaging a contact 49; when the current flows through winding 28 from right to left, relay 12 will be energized to close the movable contactor 29 in its upper or front closed position engaging a contact 50; and when no current flow exists in the winding 28, the movable contactor 29 is positioned in a neutral position, as shown, out of engagement with both of the contacts 49 and 50.

With the movable contactor 29 of relay 12 engaging contact 49, a local application circuit on the locomotive is completed from a source of supply, such as a battery 51, by way of a wire 52, contactor 29 engaging contact 49, a wire 53, the winding 54 of slave relay 14 and a wire 55 to the battery 51, thereby energizing the slave relay 14 and causing the contactor 56 thereof to be actuated to its closed position.

With the movable contactor 29 of relay 12 engaging contact 50, a local release circuit on the locomotive is completed from the battery 51 via wire 52 to movable contactor 29 engaging contact 50, a wire 57, the winding 58 of slave relay 13 and wire 55 to the battery 51, thereby energizing the slave relay 13 to cause the contactor 59 thereof to be actuated to its closed position.

In its closed position, the contactor 56 of slave relay 14 effects energization of the train brake application circuit throughout the train, by circuitry extending from a source of voltage, such as a battery 60, a supply wire 61, contactor 56 in its closed position, and the application wire 62 throughout the train, in parallel through the application magnet valves 35, one of which is on each of the cars of the train, and thence to a common return wire 63 extending through the train to the battery 60.

In its closed position, the contactor 59 of slave relay 13 effects energization of the train brake release circuit by circuitry extending from the battery 60, supply wire 61, contactor 59, and the release wire 64 extending throughout the train, in parallel through the release magnet valves 38, one of which is on each of the cars of the train, and thence to the common return wire 63 extending through the train to the battery 60.

*Operation*

When it is desired to operate the electro-pneumatic brake apparatus, the handle 10 of the brake valve 1 utilized in the conventional pneumatic brake apparatus is placed in "running" position so as to render the electro-pneumatic brake system fully effective.

With the handle 33 of the manual control device 32 in normal running condition, the contactor arm 20 is in the running position indicated on the drawing, and contactor arm 21 is in the zero pressure position indicated on the drawing such that the first branch of the bridge under these conditions consists of the major portion of the resistor 18, the second branch consists of the remaining small portion of the resistor 18, the third branch consists of the entire resistor 19 and the fourth branch consists of the resistor 31. The portion of resistor 18 from the "full application" position of contactor arm 20 to the "running" position of the contactor arm 20 is of a resistance value equal to the value of the resistor 19 in its entirety, the portion of resistor 18 from the "running" position of contactor arm 20 to the "full release" position thereof is of a resistance value equal to the value of resistance 31. From the foregoing, it can be seen that with the contactor arm 20 in its running position and the contactor arm 21 at its zero pressure position, the bridge arrangement is in a balanced condition with the resistance values of the first and third branches equal and the resistance values of the second and fourth branches equal. Accordingly, there is no resultant current flow through the winding 28 of relay 12 which is thus deenergized to effect positioning of the contactor 29 in a neutral or non-engaging position as shown on the drawing.

To effect a brake application, let it be assumed that the handle 33 on the manual control device 32 is moved to the position in its application zone indicated on the drawing, thereby effecting movement of the contactor arm 20 into the application portion of the resistor 18 to an application position, such as that shown on the drawing. With the contactor arm 20 positioned as shown and the contactor arm 21 positioned in its normal running or zero pressure position, the bridge arrangement is unbalanced with more resistance in the third branch than there is in the first branch. Accordingly, a current flow from left to right is effected to energize the winding 28 of relay 12 in a manner to close the contactor 29 on the contact 49. With contactor 29 in its back or down closed position on contact 49, the previously described local application circuit on the locomotive is completed to effect energization of the winding 54 of the slave relay 14 to cause the contactor 56 to be actuated to its closed position and thereby complete the previously-described train brake application circuit throughout the train. Energization of the brake application circuit throughout the train causes the application magnet valve 35 on each car throughout the train to operate to supply fluid under pressure from a local supply reesrvoir 36 on the car to the straight air pipe 37 and to condition the double check valve 8 on each car such that the fluid under pressure in the straight air pipe 37 is supplied to the brake cylinder 9 on each car to effect a brake application throughout the train. The fluid under pressure supplied to the straight air pipe 37 throughout the train is similarly supplied to the chamber 46 in the actuator 40 on the locomotive to cause the piston 44, piston rod 45 and actuating arm 41 to be moved upward simultaneously, to effect corresponding counterclockwise movement of contactor arm 21 of the bridge. As the contactor arm 21 moves counterclockwise on the resistor 19 due to the build-up of fluid under pressure in the straight air pipe 37 and chamber 46, the portion of resistor 19 in the third branch of the bridge is reduced until the contactor arm 21 reaches a position on the resistor 19 at which a rebalance of the bridge arrangement occurs. Rebalancing of the bridge arrangement stops the current flow through the winding 28 of relay 12, thereby deenergizing the relay 12 and causing the contactor 29 of the relay 12 to move out of engagement with contact 49 into its open-circuit neutral position as shown, thereby interrupting the local application circuit on the locomotive. With the local application circuit interrupted, the slave relay 14 is deenergized to cause opening of the contactor 56, thereby interrupting the train brake application circuit throughout the train to effect operation of application magnet valves 35 to cut off the supply of fluid under pressure from the supply reservoir 36 to the straight air pipe 37 throughout the train, with the fluid under pressure in the straight air pipe 37, the brake cylinders 9 and the chamber 46 remaining at the pressure value at which the bridge arrangement was balanced.

To effect a reduction in brake cylinder pressure, hereinafter referred to as a brake reduction, after the just described brake application, the handle 33 on the manual control device 32 is moved in a counterclockwise direction to cause corresponding counterclockwise movement of the contactor arm 20 on the resistor 18. With such movement of contactor arm 20, the bridge arrangement is unbalanced due to the resistance of the first branch becoming greater than the resistance of the third branch, thereby causing a current flow from right to left through the winding 28 of the relay 12 in a manner to actuate the contactor 29 to its upper closed position on the contact 50. With contactor 29 in its upper closed position on contact 50, the previously-described local release circuit on the locomotive is completed to cause energization of the winding 58 of slave relay 13, thereby actuating the contactor 59 thereof to its closed position to complete the previously-described train brake release circuit throughout the train. Energization of the brake release circuit throughout the train causes the release magnet valve 38 on each car of the train to operate to release fluid under pressure from the straight air pipe 37 via vent port 39 and thus release fluid under pressure from the brake cylinders 9 on the locomotive and cars and the chamber 46 on the locomotive. Releasing fluid under pressure from the chamber 46 of the actuator 40 permits the spring 47 to move the piston 44 and piston rod 45 downward to effect corresponding movement of the actuator arm 41, and thereby cause a similar degree of clockwise movement of the contactor arm 21 on the resistor 19 to increase the degree of resistor 19 in the third branch of the bridge. The reduction in the degree of brake cylinder pressure with the venting of the straight air pipe 37 and chamber 46 continues until the contactor arm 21 has moved clockwise on the resistor 19 to a degree such that the value of resistances in the first and third branches are equal, thereby rebalancing the bridge and stopping the current flow in the winding 28 of relay 12 to return contactor 29 thereof to its neutral position wherein the local release circuit on the locomotive is interrupted. With the local release circuit interrupted, the slave relay 13 is deenergized causing the brake release circuit throughout the train to be interrupted at the contactor 59 of the slave relay 13. Interruption of the brake release circuit as just described causes the release magnet valve 38 on each car to operate to stop venting fluid under pressure from the straight air pipe 37 and the brake cylinders 9 and thereby hold the brake application throughout the train at a value corresponding to the fluid pressure in the brake cylinders 9 on each car. The pressure in the straight air pipe 37 and in the chamber 46 of the actuator also accordingly remains at the same pressure value corresponding to the position of the contact arms 21 and 20 when the bridge arrangement is rebalanced.

It can thus be seen that the degree of braking can be increased or decreased any amount by merely changing the position of contactor arm 20 by use of the handle 33 to unbalance the bridge arrangement, thereby permitting supply or release of fluid under pressure to the straight air pipe to effect rebalancing of the bridge arrangement.

To effect a complete release of the brakes, the handle 33 is moved to full release position which causes the contactor arm 20 to move to the counterclockwise extremity of the resistor 18 such that the first branch of the bridge arrangement now comprises the resistor 18 in its entirety, thereby causing an unbalance of the bridge arrangement such that current flows from right to left in the winding 28 of relay 12 to close contactor 29 on contact 50 to complete the local release circuit on the locomotive. With the local release circuit complete, the slave relay 13 operates to close the contactor 59 to complete the train brake release circuit throughout the train, and thereby operate the release magnet valve 38 on each car to vent the straight air pipe 37 to cause a complete release of fluid under pressure from the brake cylinders and full brake release. As the fluid under pressure in chamber 46 is vented correspondingly with venting of straight air pipe 37, the spring 47 moves the piston 44 and piston rod 45 downward through the entire length of the chamber 46 until the chamber 46 is completely vented and the piston 44 rests on the lower end of chamber 46. With the piston 44 at its lowermost position, the actuator arm 41 moves to its lowermost position to cause the contactor arm 21 to move the entire length of the resistor 19 to the clockwise extremity on resistor 19 as indicated on the drawing by the zero pressure indication. Although the contactor arm 20 is at the counterclockwise extremity of resistor 18, and contactor 21 is at the clockwise extremity of resistor 19, the bridge arrangement is not balanced due to the resistor 18 comprising the first branch having a greater resistance value than resistor 19 comprising the third branch as previously mentioned, and the fourth branch having the resistor 31 while the second branch includes only the negligible resistance of the wire 26. The bridge arrangement remains unbalanced, thereby continuing to vent any remaining fluid under pressure from the straight air pipe 37 and the brake cylinders 9 until a time when the operator is assured of a complete brake release, at which time the operator positions the handle 33 in the "running" position to effect movement of the contactor arm 20 to the corresponding position indicated on the drawing, in which position the portion of resistor 18 utilized in the first branch equals the resistance value of the entire resistor 19 comprising the third branch, and the portion of resistor 18 in the second branch equals the resistance value of the resistor 31 in the fourth branch, thereby balancing the bridge arrangement to deenergize the relays 12, 13, 14 and interrupt the train brake release circuit to restore the train to normal operating conditions.

Throughout any operation of the electro-pneumatic brake system, the conventional pneumatic brake system is maintained ineffective by maintaining the brake valve handle 10 of the brake valve 1 in its "running" position. If it is desired to operate the pneumatic brake system, the handle 33 of the manual control device 32 is positioned in its "running" position and the handle 10 of brake valve 1 is operated as desired to the usual brake valve positions of "service," "service lap," "emergency," etc., as required to control the supply of fluid under pressure from the main reservoir 2 through the brake valve 1 to the brake pipe 4 to the control valve 3 of the well-known Westinghouse Air Brake Company D-22 type control valve on each car of the train. The control valve 7 operates in response to pressure variations in the brake pipe 4 to control supply of fluid under pressure from the auxiliary reservoirs 5 via pipes 6 and 7 to the check valve 8, which is conditioned responsive to the pressures in pipes 7 or 37 to effect supply of fluid under pressure to the brake cylinders 9 throughout the train.

FIG. 2

FIG. 2 shows an alternate arrangement, in lieu of relay 12, using two relays 65 and 66, each of which is shunted by a directional diode 67 and 68 respectively, in a manner such that current flowing from left to right causes energization of relay 66 only via a circuit which may be traced from contactor arm 20 via the diode 67 (shunting winding 72 of relay 65), a wire 69, the winding 70 of relay 66, and thence to contactor arm 21. Upon energization of relay 66, contactor 71 thereof is actuated to its closed position and thereby causes energization of the previously-described local application circuit including wires 52 and 53. When the current flows from right to left, only the winding 72 of relay 65 is energized via contactor arm 21, diode 68 (shunting the winding 66 of relay 70), wire 69, winding 72 and contactor arm 20. Upon energization of relay 65, contactor 73 thereof is actuated to its closed position and thus causes energization of the previously-described local release circuit including wires 52 and 57.

Having now described the invention, what I claim as new and desire to secure by Letters Patent is:

1. In an electro-pneumatic train brake control system having a brake application control circuit and a release control circuit for respectively controlling the supply of fluid under pressure to and exhaust of fluid under pressure from a straight air pipe extending throughout a train of cars to correspondingly pressurize a brake cylinder means on each car of the train, the combination of a Wheatstone resistance bridge apparatus comprising a first resistor, a second resistor, a third resistor, a first movable contact arm positionable at various points of contact along said first resistor to thereby divide said first resistor into two portions respectively forming a first and a second branch of said bridge apparatus connected at said points of contact, a second movable contact arm positionable at various points of contact along said second resistor to thereby divide said second resistor into two portions, one of which forms a third branch of said bridge apparatus, the other of which together with said third resistor forms a fourth branch of said bridge apparatus, current-responsive relay means electrically connected between said first and said second movable contact arms and operable out of a neutral circuit-open position to a first circuit-closing position thereof responsively to flow of current therethrough in one direction responsively to a first unbalanced condition of said bridge apparatus to effect energization of the application control circuit to cause fluid under pressure to be supplied to the straight air pipe and said brake cylinders, and operable to a second circuit-closed position thereof responsively to flow of current therethrough in an opposite direction responsively to a second unbalanced condition of said bridge apparatus to effect energization of the release control circuit to cause fluid under pressure to be released from the straight air pipe and said brake cylinders, manually operated control means having a handle rotatable to various positions to effect movement of said first movable contact arm into various points of contact along said first resistor means to initiate a first or second unbalanced condition of said bridge apparatus, and pneumatic actuator means operable responsively to fluid pressure established in the straight air pipe and said brake cylinders to effect movement of said second movable contact arm into various points of contact along said second resistor means to effect rebalance of said bridge apparatus.

2. Apparatus as claimed in claim 1, further characterized in that said first resistor has a resistance value equal to the total resistance value of said second resistor and said third resistor, so that when said first movable contact arm is positioned at one extreme of said first resistor and said second movable contact arm is positioned at the similar extreme of said second resistor, the bridge apparatus will be in an unbalanced condition to effect energization of said release control circuit.

References Cited in the file of this patent
UNITED STATES PATENTS

| | | |
|---|---|---|
| 1,103,790 | Macleary | July 14, 1914 |
| 1,852,575 | Howe | Apr. 5, 1932 |
| 2,256,287 | McCune | Sept. 16, 1941 |
| 2,413,907 | Brant | Jan. 7, 1947 |

FOREIGN PATENTS

| | | |
|---|---|---|
| 813,111 | Germany | Sept. 6, 1951 |
| 1,195,299 | France | May 19, 1959 |